H. G. MACWILLIAM.
ATTACHMENT FOR AUTOMOBILE NON-SKID TIRE CHAINS.
APPLICATION FILED MAR. 9, 1917.
1,237,929.
Patented Aug. 21, 1917.
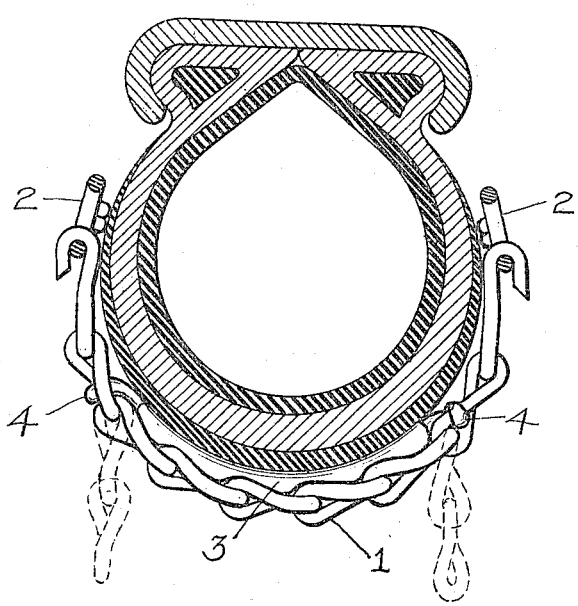
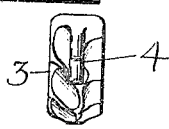
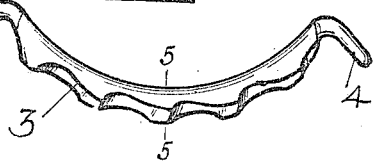
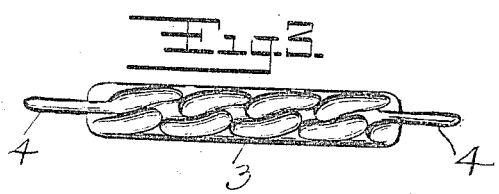
Inventor
Hugh G. Macwilliam
By his Attorney

UNITED STATES PATENT OFFICE.

HUGH G. MACWILLIAM, OF NEW ROCHELLE, NEW YORK.

ATTACHMENT FOR AUTOMOBILE NON-SKID TIRE-CHAINS.

1,237,929.        Specification of Letters Patent.        Patented Aug. 21, 1917.

Application filed March 9, 1917. Serial No. 153,705.

*To all whom it may concern:*

Be it known that I, HUGH G. MACWILLIAM, a citizen of the United States of America, residing at Beechmont, New Rochelle, New York, U. S. A., have invented new and useful Improvements in Attachments for Automobile Non-Skid Tire-Chains, of which the following is a specification.

My invention relates to attachments for automobile non-skid tire chains intended to be placed between cross chains and the tread of the tire.

The objects of my invention are to provide a device which will protect the tire from damage by the chain while allowing creeping of the chains around the wheel; will serve as a substitute for a broken cross chain until such time as it may be convenient to replace the cross chain; and will serve to restrain the free ends of a broken cross chain from striking against the mud guards or other adjacent parts of the vehicle.

My invention consists in the construction, combination, and arrangement of parts herein illustrated, described and claimed.

The accompanying drawings illustrate a preferred embodiment of my invention: In these drawings, in which similar reference characters designate corresponding parts in all figures, Figure 1 is a transverse section through a tire showing a cross chain in position with the attachment in place;

Fig. 2 is a side elevation of the attachment;

Fig. 3 is a plan looking upward at Fig. 2;

Fig. 4 is an end elevation of Fig. 2; and,

Fig. 5 is a cross section on the line 5—5 of Fig. 2.

Referring to the drawings, 1 is one of the cross chains adapted to extend across a tire tread and to be held in place preferably by attachment to a pair of circular chains 2 of smaller diameter than the circumference of the tire, one of which lies alongside each side of the tire. Disposed between the cross chain and the tire is the attachment 3, which is of a length greater than the length of that part of the cross chain which contacts the road when the tire is properly inflated.

This attachment 3 may be provided at each end with means by which it is secured to links of the cross chain 1 at each side of the tread portion thereof, and preferably to the links immediately adjacent the tread portion. These means in the form shown comprise the extensions 4 of the member 3 made of a material that can be twisted around a link in the manner shown, and yet strong enough to take the strain in case of breakage of a chain and to enable the member 3 to act in substitution for the chain as the skid preventing means. When a chain is worn through on the tread portion and breaks, the parts on each side of the break swing outward under the influence of centrifugal force, but only the sections between the points of attachment of the member 3 are free so to swing, and consequently the ends do not swing out far enough to contact with the mud guards or other parts of the vehicle.

The member 3 is preferably curved to fit the tire, and has its concave surface smooth so as not to wear the tire. The convex surface may be provided with cavities conformed to and adapted to receive the links of the chain, and also projections adapted to fit the open spaces of the chain and to maintain the attachment rigidly in place between the chain and tire under all strains.

Having now described my invention I claim and desire to secure by Letters Patent:

1. An attachment for tire chains adapted to be placed between the tire and a cross chain and provided with wire-like pliable end-extensions adapted to be bent over links of the chain on each side of the tread portion thereof, whereby the attachment may be drawn tight against the under side of the chain and secured in place thereagainst.

2. An attachment for tire chains adapted to be placed between the tire and a cross chain and having its outer surface conformed to the shape of the chain.

3. An attachment for tire chains adapted to be placed between the tire and a cross chain and provided on its outer surface with projections adapted to fit the spaces of the chain.

4. An attachment for tire chains comprising a member adapted to be placed between the tire and a cross chain and having separate recessed portions for parts of different links, and means for securing said member at each end to links of said cross chain at each side of the tread portion of said chain.

5. An attachment for tire chains comprising a member adapted to be placed between the tire and a cross chain, said member being of substantially the same width as the cross chain and having irregularities in its outer surface for engaging parts of the cross chain, the member having pliable end-extensions, whereby the end extensions may be twisted about links of said chain to interlock the said surface irregularities of the member with linked parts of the cross chain to secure the member thereto.

In testimony whereof I have signed my name to this specification.

HUGH G. MACWILLIAM.